Aug. 1, 1933.     D. G. MACKENZIE     1,920,651
STEERING ARRANGEMENT FOR MOTOR CARS
Filed Feb. 6, 1931      2 Sheets-Sheet 1
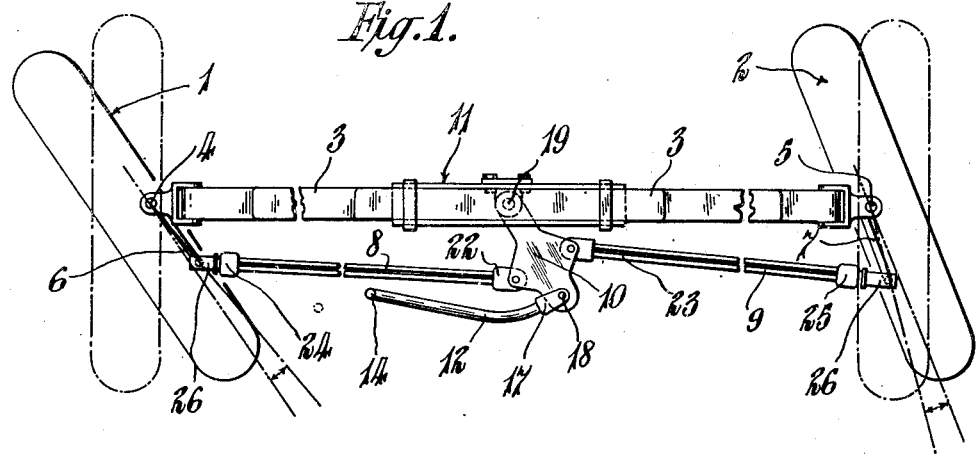
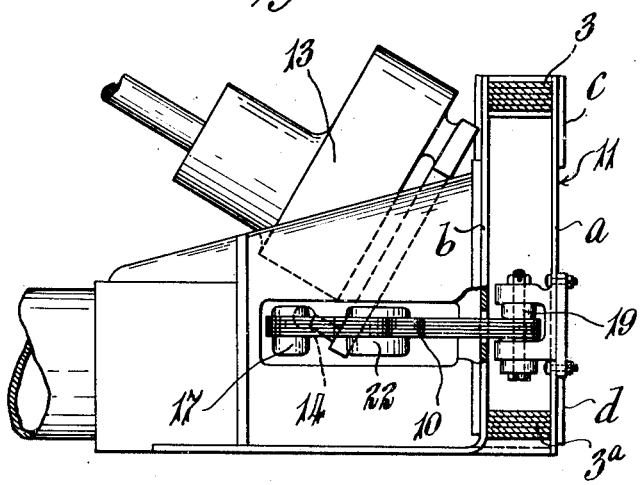
INVENTOR
D. G. Mackenzie
E. J. Featherstonhaugh
ATTORNEY

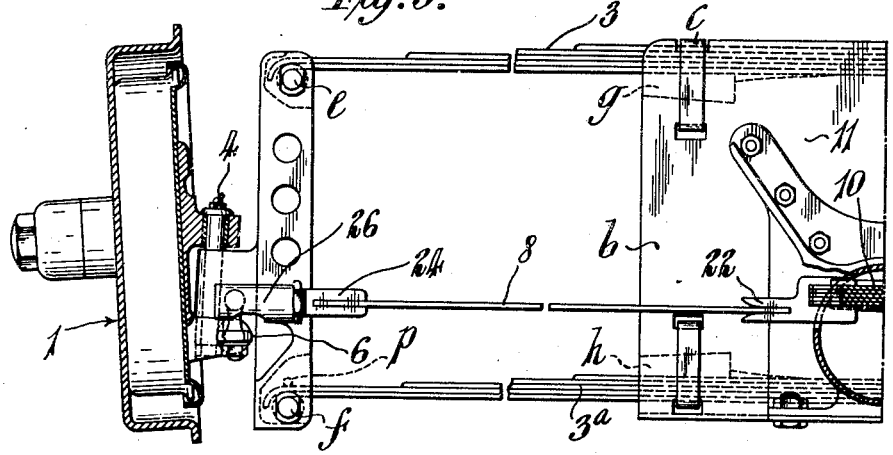
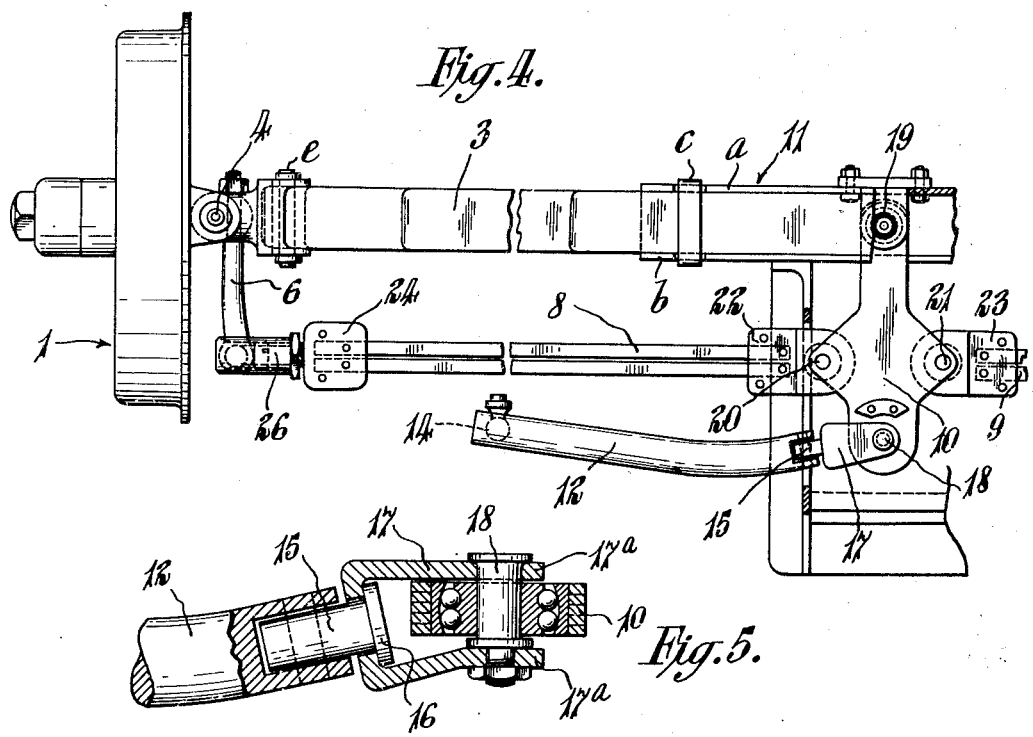

Patented Aug. 1, 1933

1,920,651

UNITED STATES PATENT OFFICE 1,920,651

STEERING ARRANGEMENT FOR MOTOR CARS

Donald Gordon Mackenzie, Montreal, Quebec, Canada

Application February 6, 1931, Serial No. 513,833, and in Great Britain February 10, 1930

8 Claims. (Cl. 280—95)

The present invention relates to improvements in or relating to steering arrangements for motor cars or like vehicles and is more particularly concerned with improvements in the steering means used in connection with front wheels having flexible axles.

According to one feature of the invention the steering means comprise a centrally pivoted plate or its equivalent operated by the steering gear and flexible tie rods pivoted to opposite sides of the plate and connected to the steering knuckle arms.

According to another feature of the invention the flexible connections between the steering knuckle arms include a spring leaf having a longitudinal slit or comprising two narrower leaves side by side so that in case of failure of the spring on one side of the slit the steering gear will not be put out of service.

In the drawings, Fig. 1 illustrates the invention diagrammatically in plan view. Fig. 2 shows a sectional side elevation of the flexible front axle also showing the steering gear. Fig. 3 shows a left-half sectional elevation of the front wheels, flexible axle and steering gear looking from the centre of the car towards the front. Fig. 4 shows a half plan similar to but showing greater details of construction than Fig. 1, while Fig. 5 shows a detail of a universal connecting joint.

Referring to Fig. 1, 1 and 2 indicate the right and left front wheels respectively. 3 indicates the leaf springs of the front flexible axle. 4 and 5 indicate the pivots or king posts about which the wheels are turned for steering purposes. 6 and 7 indicate the steering knuckle arms. The steering tie-rod according to this invention is divided into two parts, 8 and 9, these parts being vertically pivoted on opposite sides of the plate 10 and connected by universal joints to the steering knuckle arm 6 and 7. The plate 10 is vertically pivoted to the structure 11 and is operated by the rod 12 which in turn is operated by the steering wheel through the steering gear 13. Normally, that is to say, in central lock the parts 8 and 9 of the steering tie-rod lie at equal angles to the longitudinal axis of the car and nearly parallel to the flexible axle. As the lines joining the pivots of the tie-rod to the pivot of the plate 10 are inclined at a substantial angle and the steering knuckles are also inclined to the wheel plane at an angle, as shown in Fig. 1, it will be clear that the outer wheel will be deflected to a greater degree than the inner wheel. This results from the rhomboid linkage made up between the plate 10 and each steering arm 6 and 7 with the front flexible axles and spring tie-rods 8 and 9. This is clearly illustrated in Fig. 1 in which the dotted lines indicate the normal position of the wheels going straight ahead and the full lines indicate the relative positions to which they may be deflected on turning a corner. By deflecting the outer wheel to a lesser degree than the inner wheel skidding when turning corners may be avoided and this arrangement brings about the desired result in a very economical and efficient manner and to a much greater degree of accuracy than is possible when the well-known "Ackermann" linkage is used. The parts 8 and 9 consist of a spring leaf or leaves so that there is flexibility in the steering tie-rods as well as in the flexible axles. This arrangement ensures that there will not be deflections nor change of alignment of the front wheels caused by deflections of the springs or by variation in the load carried by the car. In addition, periodic vibrations such as "patter" or "shimmie" will be dampened rather than increased as in the case when using the existing types of tie rods in conjunction with the "Ackermann" linkage.

Constructional details will be better understood by referring to Figs. 2, 3, 4 and 5. The structure 11, it will be noted by reference to Figs. 1, 2, 3 and 4 comprises a body portion consisting of two plates $a$ and $b$ between which the leaf springs 3 and $3a$ are secured.

Referring to Figs. 2, 3 and 4 it will be noted that the springs 3 and $3a$ are secured to the plate by straps $c$ and $d$ respectively. These straps are located as near to the wheels as possible without unduly extending the width of the plates $a$ and $b$. The object of this is to reduce the distance between the shackle bolts $e$ and $f$ to which the leaf springs 3 and $3a$ are secured and the straps $c$ and $d$ and so reduce the amount of play and increase the horizontal stiffness normal to the spring axes between these two parts yet leaving the centre of the leaf spring free so that the advantages of a long spring may be combined with the torque resistance of a considerably shorter member. It will be understood that the right half of the sectional elevation of the front wheels is the exact counterpart of that shown in Fig. 3 so that there will be straps similar to $c$ and $d$ at an equal distance on the other side of the centre line of the bracket. Between the straps, wedges of rubberized material $g$ and $h$ are provided so as to enable the leaf springs to be secured to the structure 11 in a manner which will not interfere with the deflection of the springs. The leaf springs are secured at their ends, as shown in Fig. 3, that is, the lower spring leaf has an eye at the end through which the shackle bolt passes and the second spring leaf passes partly round the eye of the first spring leaf and between a pin or like projecting member p which prevents the second spring breaking away if the first spring should be broken so as to provide a reserve in such a contingency.

In Fig. 2 the steering gear 13 is so arranged in that the end 14 of the rod 12 is moved to the right or left in accordance with the direction of movement of the steering wheel, while the extent of movement compared with the movement of the steering wheel gradually increases as the steering wheel is moved away from its normal straight ahead position. The joint to the steering gear can be a ball or equivalent joint so as to allow for the compound movement while the other end of the rod 12 is connected to the plate 10 in the manner shown in greater detail in Fig. 5. The end of the rod 12 is provided with a pivoted member 15 having an extended portion terminated in a collar 16 engaging freely in one end of a bracket 17, the latter being provided with jaws 17a which are pivotally secured to the plate 10 by a swivel pin 18 journalled in a self-aligning roller or ball bearing. It is possible that the members 12, 15 and 17 may be constructed as a single forging as an alternative to the assembly above described. This arrangement constitutes a form of semi-universal joint which enables the movement of the rod 12 to be conveyed to the plate 10 without introducing any twisting strains on the plate. The plate 10 which can be constructed in one piece or can be built up of a number of metal stampings as shown, is pivoted on a roller or ball bearing 19 to the structure 11 and is shaped as shown in Fig. 4. The triangular lateral extending portions of the plate 10 serve as supports for the pivots 20 and 21 of the end members 22 and 23 to which the tie-rods 8 and 9 are riveted. Similar end members 24 and 25 are provided at the other end of the springs 8 and 9. Alternatively, the parts 8, 22 and 24 as also the corresponding parts 9, 23 and 25 may be constructed as a single unit. The tie-rods 8 and 9, as previously mentioned, consist of spring leaves but instead of a single leaf, two narrower spring leaves side by side are used or alternatively a single leaf slotted for a greater portion of its length so that in the case of failure of one side of the leaf or of one leaf the steering gear will not be put out of action. This constitutes a safety factor impossible to introduce in existing arrangements. To each end member 24, 25, is connected by an adjustable connection a threaded tube 26 which has either a self-aligning ball bearing or a ball joint connection to the steering knuckle arm 6, the steering knuckle arm being pivoted as shown at 4.

With a reserve spring to take up the strain in the event of the spring connected to the shackle bolt being broken, this reserve spring being so secured between the eye of the main spring leaf and the spring shackle housing or a pin set in the housing that it cannot get free of itself.

Other features of construction are described in my co-pending applications above mentioned and do not directly concern the present invention.

It will be understood that considerable modifications may be made in the constructional details without departing from the spirit of the invention. One of the characteristic features is the elimination of "patter" and "shimmie". Another the prevention of road shocks to the steering gear.

In order to obtain the best results in this direction the following combination has been found desirable. The flexible steering linkage as above described can be operated to deflect the two front road wheels together in either direction and to a greater or lesser degree of deflection individually. Each said front road wheel is arranged with its plane slightly inclined to the vertical, while the king post upon which it is pivoted is also inclined to the vertical but in the opposite direction. By this arrangement the point of road contact of each front wheel tyre lies upon the axial line of the corresponding king post, thus obtaining the advantages above set forth.

I claim:

1. In steering means for a motor car or like vehicle, an axle formed of upper and lower grouped spring leaf members spaced and bracketed centrally and at the ends, a pivot bearing within the central bracket, wheels pivoted to the end brackets knuckle arms secured to the wheel structures, connecting rods extending from said knuckle arms, a bell crank pivotally secured on either side to said connecting rods, and an operating rod suitably connected thereto.

2. In steering means for a motor car or like vehicle, an axle formed of upper and lower grouped spring leaf members spaced and bracketed centrally and at the ends, a pivot bearing formed of plate, pin and lugs secured to the front of the central bracketing and bringing the pin directly in the centre over the lower leaf members, wheels pivoted to the end brackets, knuckle arms secured to the wheel structures, connecting rods extending from said knuckle arms, a bell crank pivotally secured on either side to said connecting rods, and an operating rod suitably connected thereto.

3. In steering means for a motor car or like vehicle, an axle formed of upper and lower grouped spring leaf members spaced and bracketed centrally and at the ends, a pivot pin suitably supported in a vertical position between the upper and lower leaf groups and towards the lower group, wheels pivoted to the end brackets, knuckle arms secured to the wheel structures, connecting rods extending from said knuckle arms, a bell crank pivotally secured on either side to said connecting rods, and an operating rod suitably connected thereto.

4. In steering means for a motor car or like vehicle, an axle formed of upper and lower grouped spring leaf members spaced and bracketed centrally and at the ends, parallel lugs rigidly secured to the front member of the central bracketing, a pin and a thrust member secured in said lugs and forming a pivot bearing intermediately disposed in a central line through said leaf members, wheels pivoted to the end brackets, knuckle arms secured to the wheel structures, connecting rods extending from said knuckle arms, a bell crank pivotally secured on either side to said connecting rods, and an operating rod suitably connected thereto.

5. In steering means for a motor car or like vehicle, an axle formed of upper and lower grouped spring leaf members spaced and bracketed centrally and at the ends, a pivot bearing within the central bracket, wheels having knuckle arm holes in the king pin bearing blocks, knuckle arms secured in said holes, connecting rods extending from said knuckle arms, a bell crank pivotally secured on either side to said connecting rods, and an operating rod suitably connected thereto.

6. In steering means for a motor car or like vehicle, an axle formed of upper and lower grouped spring leaf members spaced and bracketed centrally and at the ends, a pivot bearing within the central brackets, wheels pivoted to the end brackets, knuckle arms secured to the wheel structures, rods having pivotal and swivel joint ends and connecting spring bars joining the knuckle arms to a bell crank, said bell crank being pivotally secured on either side to said connecting rods, and an operating rod suitably connected thereto.

7. In steering means for a motor car or like vehicle, an axle formed of upper and lower grouped spring leaf members spaced and bracketed centrally and at the ends, a pivot bearing within the central bracket, wheels pivoted to the end brackets, knuckle arms secured to the wheel structures, two pairs of parallel flat spring strips having swivel connections to the knuckle arms and pivotal connections at the other ends, a bell crank pivotally secured on either side to said connecting rods, and an operating rod suitably connected thereto.

8. In steering means for a motor car or like vehicle, an axle formed of upper and lower grouped spring leaf members spaced and bracketed centrally and at the ends, a pivot bearing within the central bracket, wheels pivoted to the end brackets, knuckle arms secured to the wheel structures, connecting rods extending from said knuckle arms, a bell crank in laminated plate form having an extending pivot lug at its bearing end and extending lug at its swinging end and tapering laterally to connecting rod pivots, and an operating rod secured by means of ball bearings to said crank.

DONALD GORDON MACKENZIE.